United States Patent
Song et al.

(10) Patent No.: US 9,522,653 B2
(45) Date of Patent: Dec. 20, 2016

(54) VEHICLE WIPER DEVICE

(71) Applicant: CAP CORPORATION, Sangju-si, Gyeongsangbuk-do (KR)

(72) Inventors: Kyoung Joon Song, Daegu (KR); Young Gu Kang, Daegu (KR)

(73) Assignee: CAP CORPORATION, Sangju (KR)

( * ) Notice: Subject to any disclaimer, the term of this patent is extended or adjusted under 35 U.S.C. 154(b) by 0 days.

(21) Appl. No.: 14/390,790

(22) PCT Filed: Mar. 15, 2013

(86) PCT No.: PCT/KR2013/002092
§ 371 (c)(1),
(2) Date: Oct. 5, 2014

(87) PCT Pub. No.: WO2013/151247
PCT Pub. Date: Oct. 10, 2013

(65) Prior Publication Data
US 2015/0089765 A1    Apr. 2, 2015

(30) Foreign Application Priority Data

Apr. 6, 2012    (KR) .................. 10-2012-0035962

(51) Int. Cl.
*B60S 1/40*    (2006.01)
*B60S 1/38*    (2006.01)

(52) U.S. Cl.
CPC ............ *B60S 1/3849* (2013.01); *B60S 1/3853* (2013.01); *B60S 1/40* (2013.01); *B60S 1/381* (2013.01); *B60S 1/387* (2013.01); *B60S 1/3851* (2013.01); *B60S 1/3867* (2013.01); *B60S 1/3877* (2013.01); *B60S 1/3879* (2013.01)

(58) Field of Classification Search
CPC ............ B60S 1/32; B60S 1/40; B60S 1/3849; B60S 1/3851; B60S 1/387
USPC ............ 15/250.32, 250.201, 250.43, 250.48
See application file for complete search history.

(56) References Cited

U.S. PATENT DOCUMENTS 7,587,783 B1 *  9/2009  Lin .................. B60S 1/3858
                                                15/250.201
8,595,889 B2 * 12/2013  Op'T Roodt ......... B60S 1/3858
                                                15/250.32

(Continued)

FOREIGN PATENT DOCUMENTS

KR    10-2008-0099013 A    11/2008
KR    10-2008-0108360 A    12/2008

(Continued)

*Primary Examiner* — Michael Jennings
(74) *Attorney, Agent, or Firm* — STIP Law Group, LLC

(57) ABSTRACT

Disclosed is a vehicle wiper device, comprising: a blade assembly which includes at its lower side a blade and a body spring and to which a clamp mounting plate is coupled wherein at the clamp mounting plate, there is formed at least hooking protrusion in both directions at the intermediate portion of the blade; and an adapter which is detachably coupled to the clamp mounting plate of the blade assembly, wherein the adapter comprises a fixing hook at one side of a rear portion of the lower side, and a support shoulder at a front portion of the lower side, by means of which the adapter is detachably secured to the clamp mounting plate by means of an upper and lower portion pressing way.

2 Claims, 5 Drawing Sheets

(56) References Cited

U.S. PATENT DOCUMENTS

| | | | | |
|---|---|---|---|---|
| 2006/0207050 | A1* | 9/2006 | Shanmugham | B60S 1/381 15/250.43 |
| 2007/0113366 | A1* | 5/2007 | Walworth | B60S 1/3856 15/250.32 |
| 2007/0175017 | A1* | 8/2007 | Kim | B60S 1/3801 29/557 |
| 2007/0180643 | A1* | 8/2007 | Kim | B60S 1/38 15/250.201 |
| 2008/0148509 | A1* | 6/2008 | Bacarella | B60S 1/3806 15/250.32 |
| 2008/0222829 | A1* | 9/2008 | Chiang | B60S 1/386 15/250.32 |
| 2009/0113653 | A1* | 5/2009 | Thienard | B60S 1/386 15/250.32 |
| 2009/0178226 | A1* | 7/2009 | Lee | B60S 1/381 15/250.32 |
| 2009/0307862 | A1* | 12/2009 | Boland | B60S 1/3806 15/250.32 |
| 2010/0154159 | A1* | 6/2010 | Baque | B60S 1/3848 15/250.32 |
| 2010/0186185 | A1* | 7/2010 | Grasso | B60S 1/387 15/250.32 |
| 2010/0293737 | A1* | 11/2010 | Ollier | B60S 1/3858 15/250.34 |
| 2011/0041280 | A1* | 2/2011 | Choi | B60S 1/3858 15/250.361 |
| 2011/0047742 | A1* | 3/2011 | Kim | B60S 1/3858 15/250.32 |
| 2012/0079669 | A1* | 4/2012 | Yang | B60S 1/387 15/250.32 |
| 2012/0117748 | A1* | 5/2012 | Aznag | B60S 1/386 15/250.32 |
| 2012/0144615 | A1* | 6/2012 | Song | B60S 1/4003 15/250.32 |
| 2012/0180245 | A1* | 7/2012 | Ku | B60S 1/3801 15/250.32 |
| 2012/0180247 | A1* | 7/2012 | Ku | B60S 1/3853 15/250.32 |
| 2012/0222231 | A1* | 9/2012 | Ku | B60S 1/4087 15/250.32 |
| 2012/0297567 | A1* | 11/2012 | Hyer | B60S 1/3801 15/250.32 |

FOREIGN PATENT DOCUMENTS

| | | | |
|---|---|---|---|
| KR | 10-2010-0102877 A | 9/2010 | |
| KR | 10-1038760 B1 | 6/2011 | |
| WO | WO 2011120232 A1 * | 10/2011 | B60S 1/387 |

* cited by examiner (a)

(b)

(c)

VEHICLE WIPER DEVICE

CROSS REFERENCE TO PRIOR APPLICATIONS

This application is a National Stage Application of PCT International Patent Application No. PCT/KR2013/002092 filed on Mar. 15, 2013, under 35 U.S.C. §371, which claims priority to Korean Patent Application No. 10-2012-0035962 filed on Apr. 6, 2012, which are all hereby incorporated by reference in their entirety.

TECHNICAL FIELD

The present invention relates to a vehicle wiper device, and in particular to a vehicle wiper device which makes it possible to simplify a wiper manufacturing process and enable a user to easily do an adapter coupling and decoupling work in such a way to change a coupling way between an adaptor and a mounting plate of a clamp from a typical sliding way to a coupling and decoupling way wherein a lower coupling part of an adapter is coupled or decoupled using a fixing hook based on upper and lower portion pressing.

BACKGROUND ART

A vehicle wiper device is generally configured to perform a function of wiping snow, rain water or a variety of impurities off the surface of a windshield glass, thus obtaining a good field of view for the sake of a vehicle driver's safe driving.

Such a wiper device comprises a blade configured to move in a close contact state with the surface of a windshield glass and made from a flexible rubber material and having a predetermined length long enough to wipe off snow, rain water or a variety of impurities, a body spring coupled to top of the blade and having a predetermined curvature and an elastic force, a clamp coupled to the center of a longitudinal direction of the body spring, an adapter whose bottom is coupled to the clamp, a connector rotatably secured to the adapter, and an arm whose one end is connected to a motor installed inside of a vehicle and the other end is detachably connected to the connector, thus transferring a rotational driving force.

In the construction of the above-described vehicle wiper device, the engaging structure between the related adapter and the clamp will be described.

FIG. 5 is a view illustrating a step-by-step state that an adapter is coupled to a clamp of a blade in a related vehicle wiper device.

Referring to FIG. 5, a hooking protrusion of a mounting plate of a clamp 5 fits in an insertion portion of the bottom of the adapter 1 (FIG. 5A). In the pressed state, it slides backward (FIG. 5B), and the coupling is finally finished based on an elastic transformation of the insertion protrusion formed at the adapter 1 (FIG. 5C).

In the coupling way between the adapter 1 and the blade clamp 5 in the above-described related vehicle wiper device, it needs to perform a position fitting work wherein the hooking protrusion of the mounting plate of the clamp 5 is inserted into the insertion portion of a lower side of the adapter 1 without any interference with each other. After the position fitting work, it needs to slide backward by a predetermined distance in a state that a predetermined level of pressure is being applied in a downward direction so as to finish the coupling of the two components by means of an elastic force of the insertion protrusion 1a formed at the adapter 1.

More specifically, the procedures for coupling the adapter 1 to the mounting plate of the clamp 5 of the blade should be performed over a few separated steps, and it also needs to adjust the positions for the sake of good insertions when coupling the insertion portion of the lower side of the adapter 1 and the hooking portion of the mounting plate of the clamp 5, which causes lots of cumbersome procedures during work. Such cumbersome procedures may result in inconvenience and bad work efficiency during the manufacturing of the related vehicle wiper device.

DISCLOSURE OF INVENTION

Technical Problem

Accordingly, the present invention is made in an effort to improve the above-described problems. It is an object of the present invention to provide a vehicle wiper device which makes it possible to enhance work efficiency during the manufacturing of a wiper along with easier coupling between the adapter and the mounting plate of the clamp, in such a way to improve a coupling way of coupling the adapter and the mounting plate of the clamp which are components belonging to the vehicle wiper device from the related sliding way to an upper and lower portion pressing way which uses the fixing hook.

Solution to Problem

To achieve the above object, there is provided a vehicle wiper device, comprising a blade assembly which includes at its lower side a blade and a body spring and to which a clamp mounting plate is coupled wherein at the clamp mounting plate, there is formed at least hooking protrusion in both directions at the intermediate portion of the blade; and an adapter which is detachably coupled to the clamp mounting plate of the blade assembly, wherein the adapter comprises a fixing hook at one side of a rear portion of the lower side, and a support shoulder at a front portion of the lower side, by means of which the adapter is detachably secured to the clamp mounting plate by means of an upper and lower portion pressing way.

The fixing hook of the adapter comprises at its lower side a slanted protrusion shoulder formed in forward and backward directions, and a fixing hook moving space portion is formed at a neighboring portion in forward and backward directions of the fixing hook.

Also, the fixing hook of the adapter comprises at its lower portion a side surface protrusion by means of which a moving operation in forward and backward directions becomes easier.

Furthermore, the support shoulder of the adapter comprises a horizontal support shoulder configured to block the hooking protrusion formed at one side of the clamp mounting plate inserted into the inside from moving in upward and downward directions; and a vertical support shoulder configured to block the movements in forward and backward directions.

Advantageous Effects

The present invention is characterized in that the coupling way between the adapter and the mounting plate of the clamp is changed from the related sliding way to a structure wherein the coupling portion of the lower side of the adapter is configured in a hook shape and to receive forces in upward and downward directions, by means of which coupling becomes easier, thus saving manufacturing cost thanks to the enhanced production yield during the manufacturing of the wiper. The user may more easily and conveniently couple or decouple the adapter for thereby obtaining convenience when in use.

BEST MODES FOR CARRYING OUT THE INVENTION

The exemplary embodiment of the vehicle wiper device according to the present invention will be described with reference to the accompanying drawings.

Figure 1:
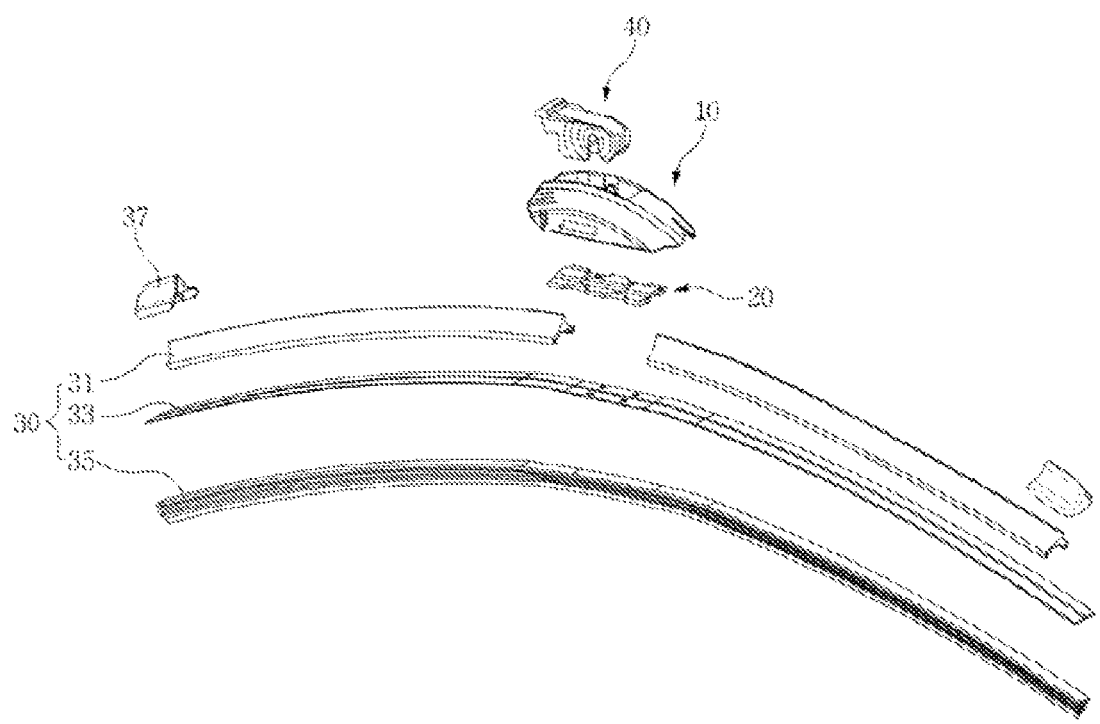
FIG. 1 is a disassembled perspective view illustrating a structure of a vehicle wiper structure according to the present invention.
Figure 2:
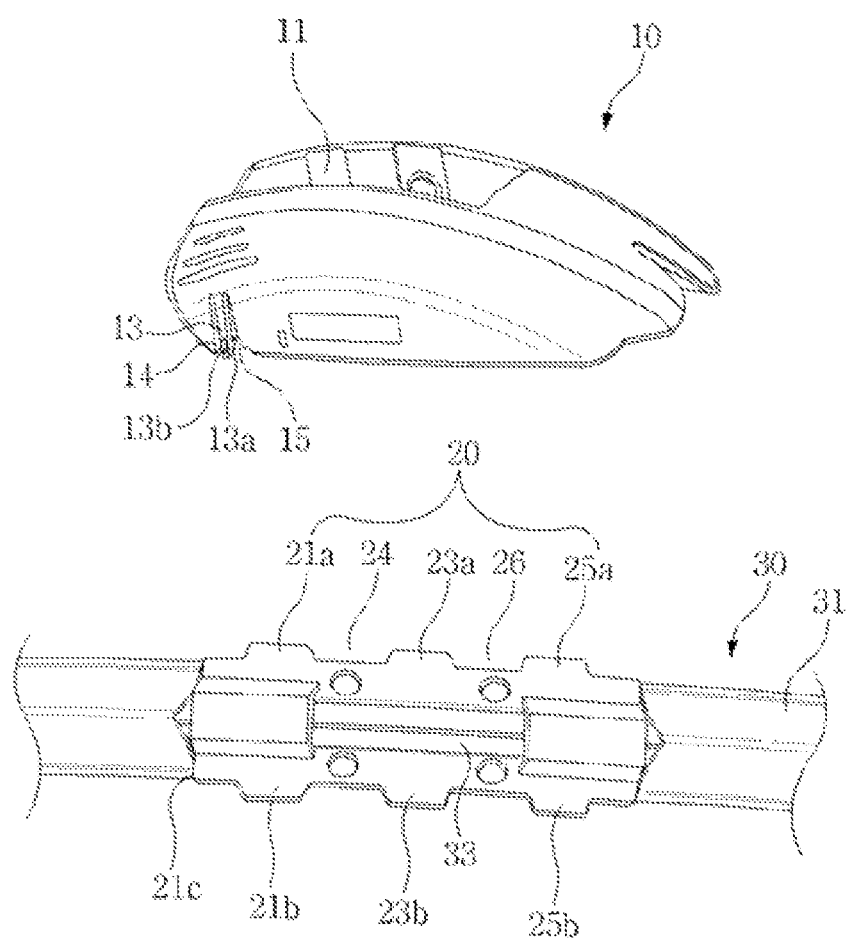
FIGS. 2 and 3 are perspective views illustrating a structure of an adapter and a mounting plate of a clamp of FIG. 1 according to the present invention.
Figure 3:
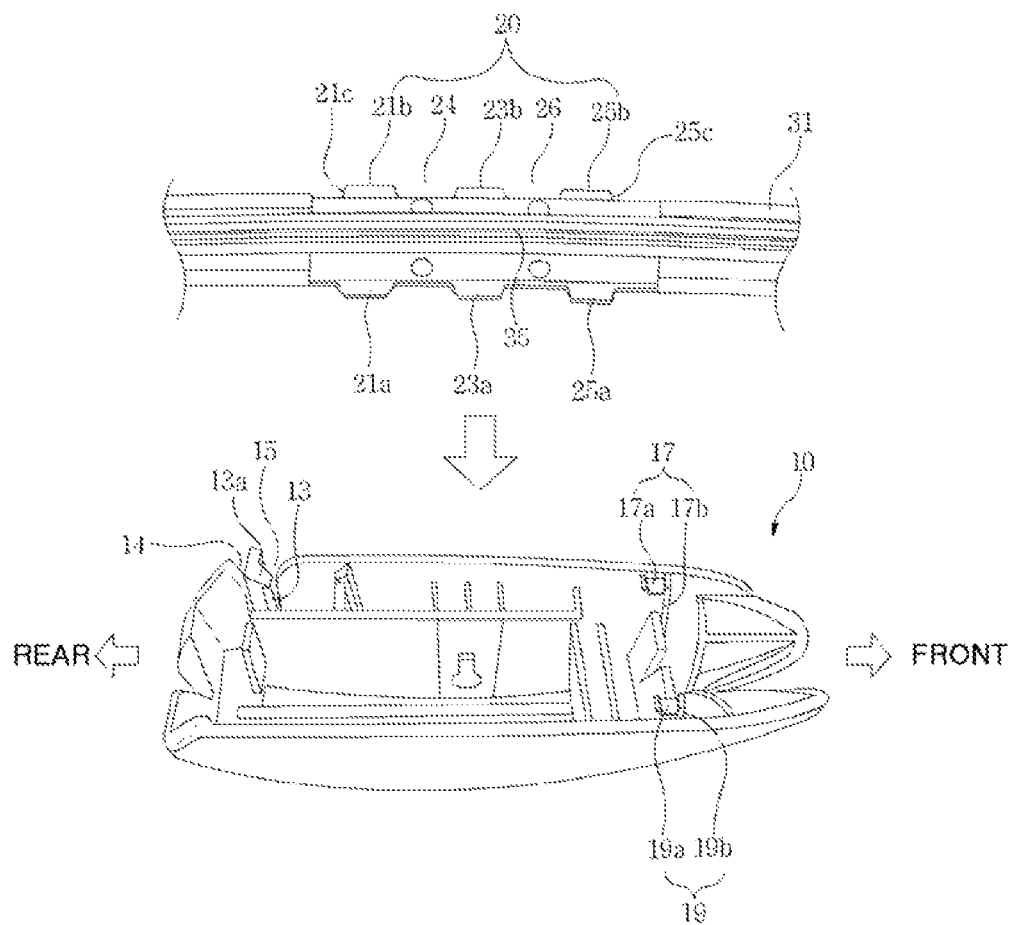

FIG. 1 is a disassembled perspective view illustrating a structure of a vehicle wiper device according to the present invention, and FIGS. 2 and 3 are perspective views for explaining a structure of the adapter and the mounting plate of the camp of FIG. 1, and FIG. 3 is a view when viewing in the opposed direction of FIG. 2.

Referring to FIG. 1, the vehicle wiper device according to the present invention comprises a blade 35 which is made from a rubber material and has a predetermined length long enough to wipe snow, rain water or a variety of impurities stuck off the surface of a windshield glass, and a body spring 33. There are further provided a blade assembly 30 wherein a clamp mounting plate 20 is coupled to the center of the blade 35, and an adapter 10 which is detachably secured to the clamp mounting plate 20 of the blade assembly 30 and includes a connector connection groove configured to connect the connector 40 to which a driving arm connected to the vehicle body is connected.

In the above-described structure, the blade assembly 30 further comprises a windshield strip 31 engaged to top of the body spring 33, and an end stopper 37 engaged to both side ends.

The present invention is characterized in that the adapter 10 may be coupled to the clamp mounting plate 20 by means of more easier handling in such a way to improve the structure of the adapter 10 which is a component member in the vehicle wiper device according to the present invention.

Referring to FIG. 3, the adapter 10 according to the present invention comprises a fixing hook 13 at one rear side of the lower surface, and support shoulders 17 and 19 at the front side of the lower surface.

Any component is not disposed between the fixing hook 13 and the support shoulders 17 and 19, but a predetermined empty space is formed between them instead, so the hooking protrusions 21, 23 and 25 of the clamp mounting plate 20 may be inserted in the space without any interferences, which is designed so as to eliminate any inconvenience in the related adapter structure wherein it needs to adjust the positions when inserting a plurality of the hooking protrusions 21, 23 and 25 formed at the clamp mounting plate 20 after paring them which procedure is required because a plurality of support shoulders are formed at regular intervals at the lower side of the adapter in the related adapter structure.

In the above-described construction, the fixing hook 13 of the adapter comprises a slanted protrusion shoulder 13a at a lower side of which a slanted surface is formed in forward and backward directions. In the neighboring portion of the forward and backward direction of the fixing hook 13, there are formed fixing hook moving space portions 14 and 15 along which the fixing hook 13 may move.

Also, the fixing hook 13 of the adapter comprises a side surface protrusion 13b protruding in a lateral direction of the lower side portion where the protrusion shoulder 13a is formed. The side surface protrusion 13b allows the coupled state between the adapter 10 and the clamp mounting plate 20 to be easily decoupled in such a manner to move backward the fixing hook 13.

Also, the support shoulders 17 and 19 formed at the lower side of the adapter 10 are configured to prevent front hooking protrusions 25a and 25b of the clamp mounting plate 20 inserted in the inside of the same from moving in an upward, downward, forward or backward direction. The support shoulders 17 and 19 comprise horizontal support shoulders 17a and 19a configured to prevent the front hooking protrusions 25a and 25b of the clamp mounting plate from moving in upward and downward movements, and vertical support shoulders 17b and 19b configured to prevent the hooking protrusions 25a and 25b of the clamp mounting plate from moving in forward and backward movements.

When the front hooking protrusions 25a and 25b of the clamp mounting plate 20 are inserted into the inside of the support shoulders 17 and 19 with the aid of the formation of the support shoulders 17 and 19, the forward and backward movements are blocked by means of the vertical support shoulders 17b and 19b, and the upward and downward movements are blocked by means of the horizontal support shoulders 17a and 19a.

When the front hooking protrusions 25a and 26b of the clamp mounting plate 20 are inserted into the inside of the support shoulders 17 and 19 of the adapter, the position of the end of the front side of the clamp mounting plate 20 is fixed in place by means of the support shoulders 17 and 19. In this state, when the rear portion of the adapter 10 is pressed down, intermediate hooking protrusions 23a and 23b of the clamp mounting plate 20 are inserted into the inside space of the adapter 10 without any interference.

In the above-described construction, it is preferred that the fixing hook 13 formed at the adapter 10 may be selectively installed at one side of the lower portion of or at the other side of the lower portion of the adapter 10 in consideration of work efficiency.

In the clamp mounting plate 20, the intermediate portion of each of the hooking protrusions 21a, 21b; 23a, 23b; 25a, 25b which all protrude outward forms concave groove portions 24 and 26 which are inwardly concave.

Figure 4A:
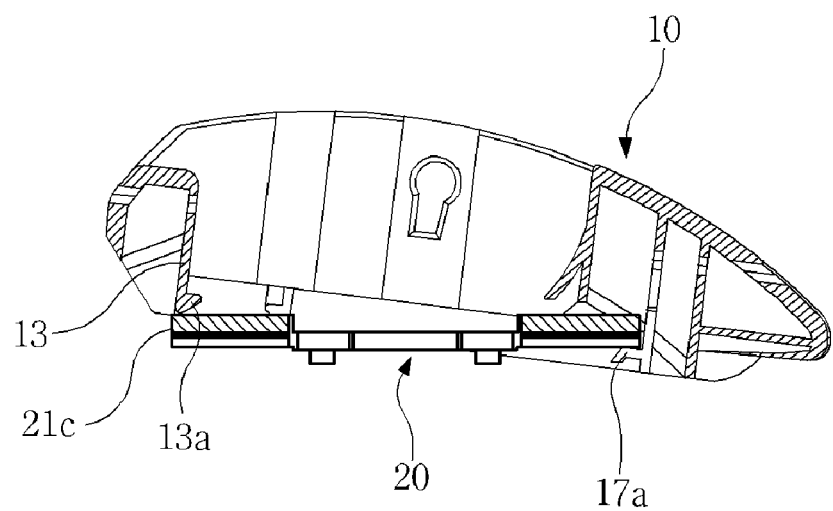
FIGS. 4A to 4C are schematic cross sectional views illustrating a state that an adapter and a mounting plate of a clamp according to the present invention are being coupled step-by-step.
Figure 4B:
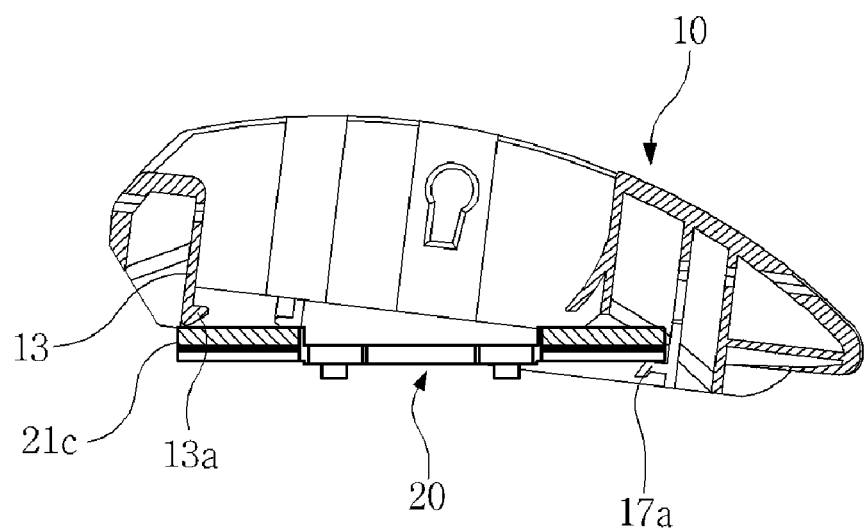
Figure 4C:
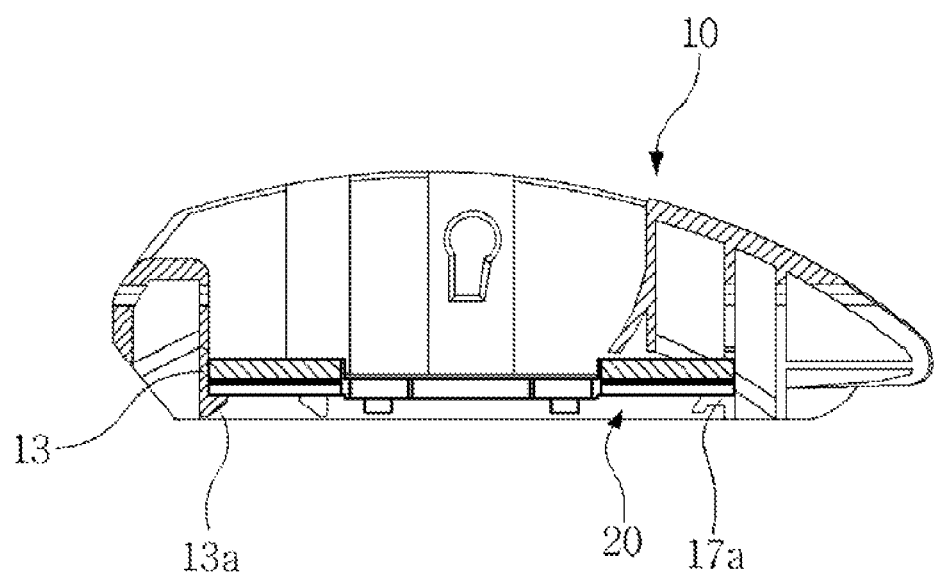
Figure 5:
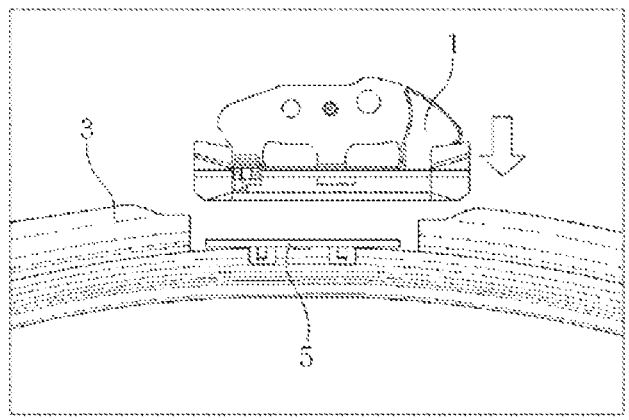
FIG. 5 is a view illustrating a view illustrating a state that an adapter and a mounting plate of a clamp are being coupled step-by-step in a related vehicle wiper device.
Figure 5:
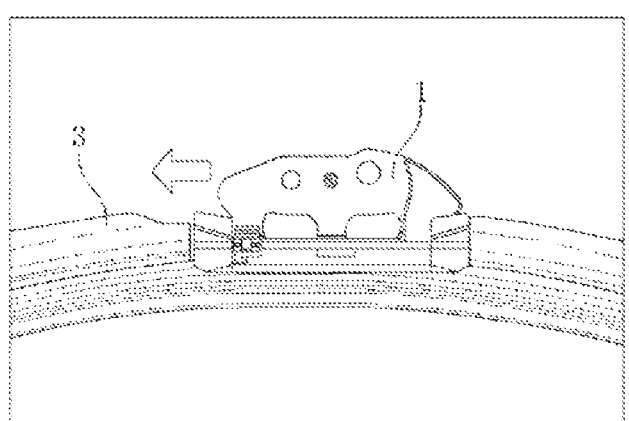
Figure 5:
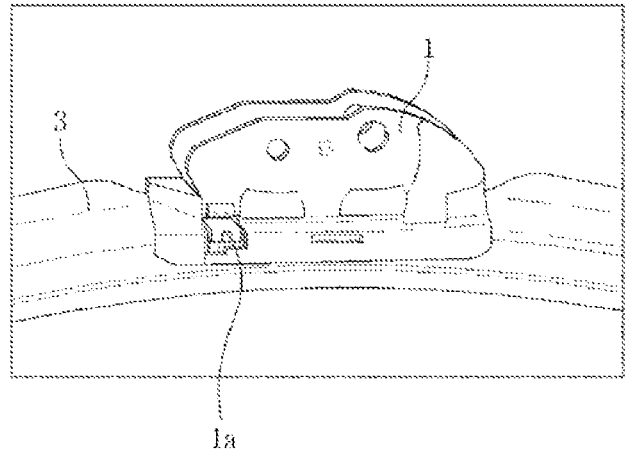

FIGS. 4A to 4C are schematic cross sectional views illustrating a state that the adapter and the clamp mounting plate are being coupled step-by-step according to the present invention.

The coupling procedure of the adapter 10 and the clamp mounting plate 20 according to the present invention will be described with reference to the accompanying drawings.

First of all, the front hooking protrusions 25a and 5b of the clamp mounting plate 20 are inserted into the insides of the support shoulders 17 and 19 of the lower side of the adapter 10 by tilting the lower end of the front side of the adapter 10. At this time, the space of the lower side of the adapter 10, more specifically, the space formed between the fixing hook 13 of the lower side and the support shoulders 17 and 19 is an empty space in which any component is not disposed, so the clamp mounting plate 20 may be easily inserted. Namely, the hooking protrusion of the clamp mounting plate 20 may be easily inserted without any interferences (refer to FIG. 4A).

In a state that the front hooking protrusions 25a and 25b of the clamp mounting plate 20 are supported by the support shoulders 17 and 19 of the adapter, when the rear side of the adapter 10 is pressed down, the lower end of the fixing hook 13 of the rear side of the adapter comes into contact with the hooking protrusion 21b of the rear portion of one side of the clamp mounting plate 20 (refer to FIG. 4B).

When the portion of the adapter where the fixing hook 13 is positioned is further pressed, the fixing hook 13 is tilted backward by means of the slanted protrusion shoulder 13a of the slanted surface formed at the lower side, and at the same time, the fixing hook 13 moves downward over a side surface portion 21c of the hooking protrusion 21b of the rear portion of one side of the clamp mounting plate 20. After it passes through the side surface portion 21c, the fixing hook 13 recovers by means of elastic force and is positioned at the lower side of the engaging protrusion 21b of the rear portion of one side of the clamp mounting plate 20, so the coupling between the adapter 1 and the clamp mounting plate 20 is finished (refer to FIG. 4C).

The coupling way between the adapter and the clamp mounting plate in the vehicle wiper device according to the present invention is directed to a structure wherein the coupling portion of the lower side of the adapter is formed in a hook shape to receive force in upward and downward directions as compared to the related sliding way, so coupling is easy in the present invention.

The vehicle wiper device according to the present invention is characterized in that the worker's work efficiency may be enhanced during the manufacturing process of the wiper, so the manufacturing cost may be saved thanks to the enhanced production yield of the vehicle wiper.

*Legend of Reference Numbers*

| | |
|---|---|
| 10: adapter | 11: connector coupling groove |
| 13: fixing hook | 13a: slanted protrusion shoulder |

*Legend of Reference Numbers*

| | |
|---|---|
| 13b: side surface protrusion | 14, 15: fixing hook moving space portion |
| 17, 19: support shoulder | 20: clamp mounting plate |
| 21a, 21b, 23a, 23b, 25a, 25b: hooking protrusions | |
| 24, 26: concave groove portion | |
| 30: blade assembly | 31: windshield strip |
| 33: body spring | 35: blade |
| 37: end stopper | 40: connector |

The invention claimed is:

1. A vehicle wiper device, comprising:
a blade assembly which includes a blade at its lower side;
a body spring;
a clamp mounting plate provided at the intermediate portion of the blade wherein at least hooking protrusion is formed at the clamp mounting plate in opposite directions such that the clamp mounting is coupled to the blade; and
an adapter which is detachably coupled to the clamp mounting plate of the blade assembly,
wherein the adapter comprises:
a fixing hook at one side of a rear portion of the lower side;
a support shoulder at a front portion of the lower side such that the adapter is detachably secured to the clamp mounting plate by means of pressing of an upper and lower portions; and
a fixing hook moving space portion formed at a neighboring portion in forward and backward directions of the fixing hook,
wherein the fixing hook of the adapter comprises:
a slanted protrusion shoulder at the lower side and the under side of the slanted protrusion shoulder is downward slanted such that when the slanted protrusion shoulder is forced perpendicular to the longitudinal direction of the adaptor, the slanted protrusion shoulder elastically bends along the longitudinal direction of the adaptor to couple with the clamp mounting plate of the blade assembly; and
a side surface protrusion at its lower side by means of which a moving operation in forward and backward directions becomes obtainable.

2. The device of claim 1,
wherein the support shoulder of the adapter comprises:
a horizontal support shoulder configured to block the hooking protrusion formed at one side of the clamp mounting plate inserted into the inside from moving in upward and downward directions; and
a vertical support shoulder configured to block the movements in forward and backward directions.

* * * * *